United States Patent
Inagaki

(10) Patent No.: US 10,248,011 B2
(45) Date of Patent: Apr. 2, 2019

(54) PROJECTION APPARATUS, CONTROL METHOD THEREOF AND STORAGE MEDIUM

(71) Applicant: CANON KABUSHIKI KAISHA, Tokyo (JP)

(72) Inventor: Kensuke Inagaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/055,980

(22) Filed: Aug. 6, 2018

(65) Prior Publication Data

US 2019/0049831 A1  Feb. 14, 2019

(30) Foreign Application Priority Data

Aug. 9, 2017 (JP) .................................. 2017-153922

(51) Int. Cl.
| | |
|---|---|
| G03B 21/14 | (2006.01) |
| H04N 9/31 | (2006.01) |
| G03B 21/20 | (2006.01) |
| G03B 21/00 | (2006.01) |
| H04N 5/74 | (2006.01) |

(52) U.S. Cl.
CPC ....... *G03B 21/2006* (2013.01); *G03B 21/006* (2013.01); *G03B 21/206* (2013.01); *G03B 21/2053* (2013.01); *H04N 5/74* (2013.01); *H04N 9/31* (2013.01)

(58) Field of Classification Search
CPC .............. G03B 21/14; G03B 21/2006; G03B 21/2053; G03B 21/206; H04N 9/31; H04N 5/74

See application file for complete search history.

(56) References Cited

U.S. PATENT DOCUMENTS

| | | | | |
|---|---|---|---|---|
| 2010/0165304 A1* | 7/2010 | Ozawa | ............... | G03B 21/2053 353/85 |
| 2010/0302465 A1* | 12/2010 | Shoji | ................... | H04N 5/4403 348/744 |
| 2015/0029468 A1* | 1/2015 | Kurata | ............... | G03B 21/2026 353/52 |

FOREIGN PATENT DOCUMENTS

| | | |
|---|---|---|
| JP | 2007-178636 A | 7/2007 |
| JP | 2015-050676 A | 3/2015 |

* cited by examiner

*Primary Examiner* — William C Dowling
(74) *Attorney, Agent, or Firm* — Canon U.S.A., Inc. IP Division

(57) ABSTRACT

A projection apparatus includes a light source that emits light, a projection unit that projects an image on a projection surface based on the light emitted by the light source, a projection control unit that controls the light source and the projection unit, a control unit that controls the projection control unit based on schedule information where an operation of the projection apparatus and a time of performing the operation are associated in advance, and a storage unit that stores a number of operations of turning on/off the light source and a total lighting time of the light source. If the control unit performs a power-off operation of the projection apparatus based on the schedule information, the control unit controls whether to turn off the light source based on the power-off operation based on the number of the operations and the total lighting time.

16 Claims, 4 Drawing Sheets

FIG. 2

| | MON | TUE | WED | THU | FRI | SAT | SUN |
|---|---|---|---|---|---|---|---|
| 8:00 | | | 8:00 POWER-ON | | | | |
| 9:00 | 9:00 POWER-ON | | | | | | |
| 10:00 | | | | | | | |
| 11:00 | | | | | | | |
| 12:00 | | | 12:00 POWER-OFF | | | | |
| 13:00 | 13:00 DVI INPUT | | 13:00 POWER-ON | | 13:00 POWER-ON | | |
| 14:00 | 14:00 ANALOG INPUT | | | | | | |
| 15:00 | | | | | | | |
| 16:00 | | | | | | | |
| 17:00 | 17:00 POWER-OFF | | 17:00 POWER-OFF | | | | |
| 18:00 | | | | | 18:00 POWER-OFF | | |

US 10,248,011 B2

PROJECTION APPARATUS, CONTROL METHOD THEREOF AND STORAGE MEDIUM

BACKGROUND

Field

The present disclosure relates to a projection apparatus, a control method thereof and a storage medium.

Description of the Related Art

In recent years, it has become common to project materials using projection apparatuses (projectors) in conference spaces, classrooms, or the like. Some projectors include an internal clock equipped with a function (hereinafter referred to as a "schedule function") that automatically performs a predetermined operation at a scheduled time, for example, a power on/off operation.

A lamp as a light source used for a projector includes a characteristic that the lamp gradually becomes darker in proportion to a lighting time elapsed. There is a characteristic that a lifetime of the lamp is shortened if the lamp is repeatedly turned on and turned off. Therefore, it is not preferable to repeatedly turn on and turn off the lamp in a short time. However, when the projector is used for an electronic signage (digital signage), on/off of the lamp as a light source may be forced in a short period of time due to a distribution system of images to be displayed, or the like.

To avoid turn-on and turn-off in a short period of time, Japanese Patent Application Laid-Open No. 2015-050676 discusses a technology to display a message that a power-on operation is suspended if an interval between times when a user performs an off operation and an on operation scheduled thereafter is within a predetermined time.

Japanese Patent Application Laid-Open No. 2007-178636 discusses a technology to reduce a luminance of a lamp without turning off the lamp if a time interval between an off operation by a user and an on operation scheduled thereafter is within a predetermined time.

SUMMARY

According to an aspect of the present disclosure, a projection apparatus includes a light source configured to emit light, a projection unit configured to project an image on a projection surface based on the light emitted by the light source, a projection control unit configured to control the light source and the projection unit, a control unit configured to control the projection control unit based on schedule information in which an operation of the projection apparatus and a time at which the operation is to be performed are associated in advance, and a storage unit configured to store a number of operations of turning on or turning off the light source and a total lighting time of the light source, wherein, in a case where the control unit performs a power-off operation of the projection apparatus based on the schedule information, the control unit performs control whether to turn off the light source based on the power-off operation based on the number of the operations and the total lighting time.

Further features will become apparent from the following description of exemplary embodiments with reference to the attached drawings.

BRIEF DESCRIPTION OF THE DRAWINGS

FIG. 2 is a schematic diagram illustrating a content example of a weekly schedule.

DESCRIPTION OF THE EMBODIMENTS

Hereinafter, an exemplary embodiment of the present disclosure will be described in detail with reference to the drawings. The following exemplary embodiment is not seen to be limiting. The exemplary embodiment describes an exemplary mode and does not limit the scope of the disclosure.

Figure 1:
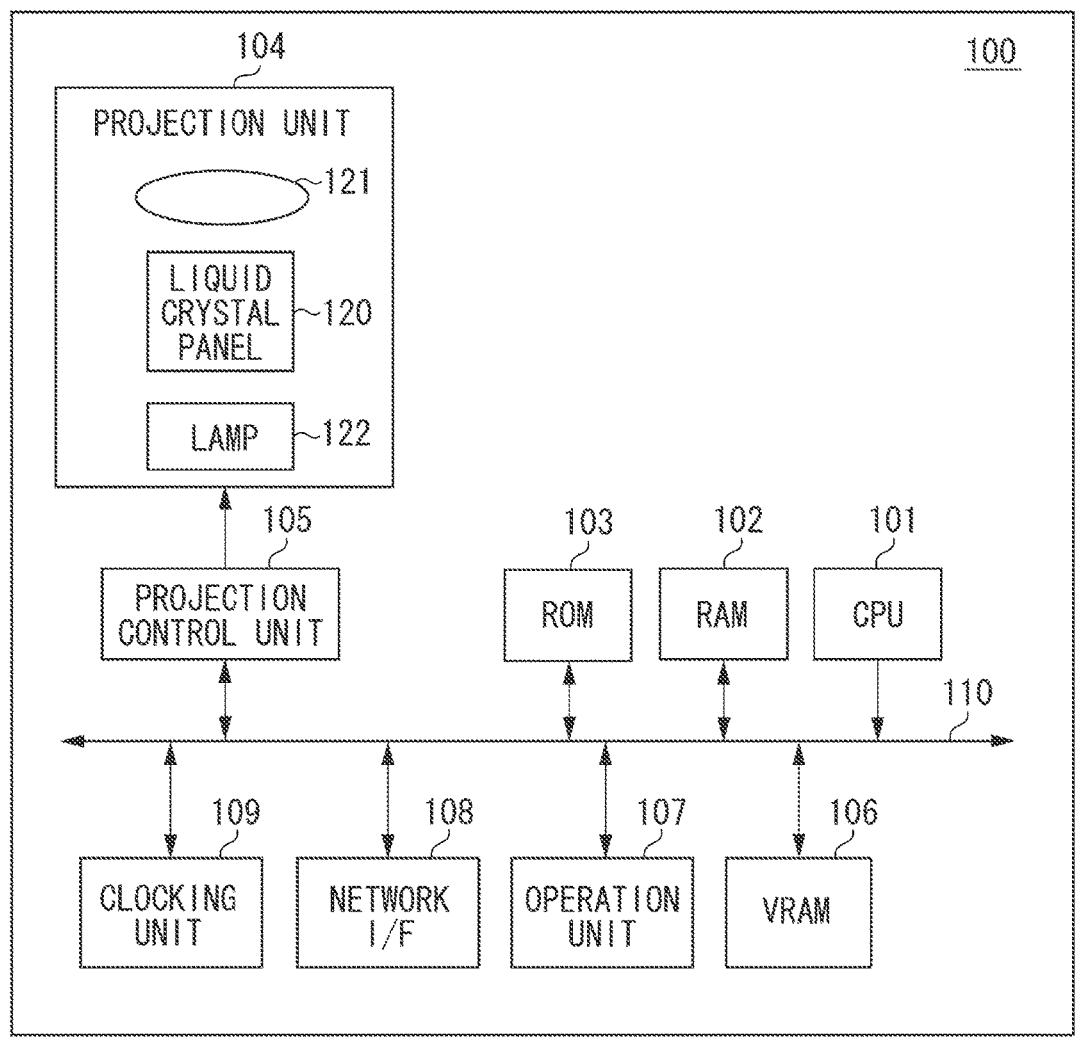
FIG. 1 is a schematic block diagram of a configuration of an exemplary embodiment.

FIG. 1 illustrates a schematic block diagram of a configuration of an exemplary embodiment of a projection apparatus according to an exemplary embodiment.

A projection apparatus 100 illustrated in FIG. 1 includes a central processing unit (CPU) 101, a random access memory (RAM) 102, a read-only memory (ROM) 103, a projection unit 104, a projection control unit 105, a video random access memory (VRAM) 106, an operation unit 107, a network interface (I/F) 108, and a clocking unit 109. An internal bus 110 connects each of blocks 101 to 109.

The CPU 101 controls each operation block of the projection apparatus 100.

The RAM 102 temporarily stores a control program and data as a working memory.

The ROM 103 stores a control program describing a processing procedure of the CPU 101. The ROM 103 includes a storage unit including a nonvolatile memory, and schedule information (a time, operations scheduled to be performed, and the like) designated by a user is also stored in the nonvolatile memory of the ROM 103.

The projection unit 104 optically projects an image instructed by the projection control unit 105 onto, for example, a screen (not illustrated). The projection unit 104 includes a liquid crystal panel 120, a projection lens 121, and a lamp 122 as a light source. The liquid crystal panel 120 is a light modulation element that spatially modulates intensity of output light from the lamp 122. As a result of such modulation of the intensity of the output light of the lamp 122 by the liquid crystal panel 120, an image to be projected is generated. The projection lens 121 projects the image onto the screen.

The projection control unit 105 reads image data stored in the VRAM 106, causes the liquid crystal panel 120 of the projection unit 104 to display a corresponding image, and controls on/off and a luminance of the lamp 122 of the projection unit 104.

The VRAM 106 stores image data of an image to be projected by the projection unit 104.

The operation unit 107 accepts a user's operation and transmits an instruction signal corresponding to the user's operation to the CPU 101. The operation unit 107 includes, for example, a switch and a dial. The operation unit 107 also receives an operation signal from a remote controller (not illustrated) and transmits an instruction signal corresponding to the received operation signal to the CPU 101.

The network I/F 108 is a communication unit that communicates with external devices via a network.

The clocking unit 109 includes a built-in battery and a real time clock, and clocks the time. Since the clocking unit 109 operates with the built-in battery, it is possible to clock the time in any state of power on/off of the projection apparatus 100. The CPU 101 acquires current time information, such as the date, date and time, and day of the week from the clocking unit 109 via a system bus 110.

A schedule function of the projection apparatus 100 will be described with reference to FIG. 2. FIG. 2 is a schematic diagram illustrating an example of operation contents stored in the nonvolatile memory of the ROM 103 by the schedule function in a calendar format. A schedule to be registered includes operation information, such as the day of the week, time, power-on/off, and input switching. In an example illustrated in FIG. 2, on Monday, a schedule of a power-on operation at 9 o'clock, switching to digital video interface (DVI) input at 13 o'clock, switching to analog input at 14 o'clock, and a power-off operation at 17 o'clock is registered.

The CPU 101 performs an operation of a planned schedule using these schedules stored in the ROM 103 and the time acquired from the clocking unit 109. Specifically, the CPU 101 acquires a current time from the clocking unit 109 at one-minute intervals, checks the schedule stored in the ROM 103, and performs the operation registered in the schedule in a case where the time on the schedule and the current time match.

The CPU 101 can control the projection apparatus 100 based on an operation input by the user via the operation unit 107. The user can also input an instruction of a power-off operation to the CPU 101 via the operation unit 107.

When the CPU 101 is instructed to turn off the power based on the schedule or the user's operation, it is assumed that a power-off operation is performed for the CPU 101.

FIG. 2 illustrates a weekly schedule. The CPU 101 executes the weekly schedule every week. In addition to the weekly schedule, a date designated schedule can also be registered. These schedules can be registered from a graphical user interface (GUI) displayed on a projection surface or from a web page provided by a web server mounted on the projection apparatus 100.

Figure 3:
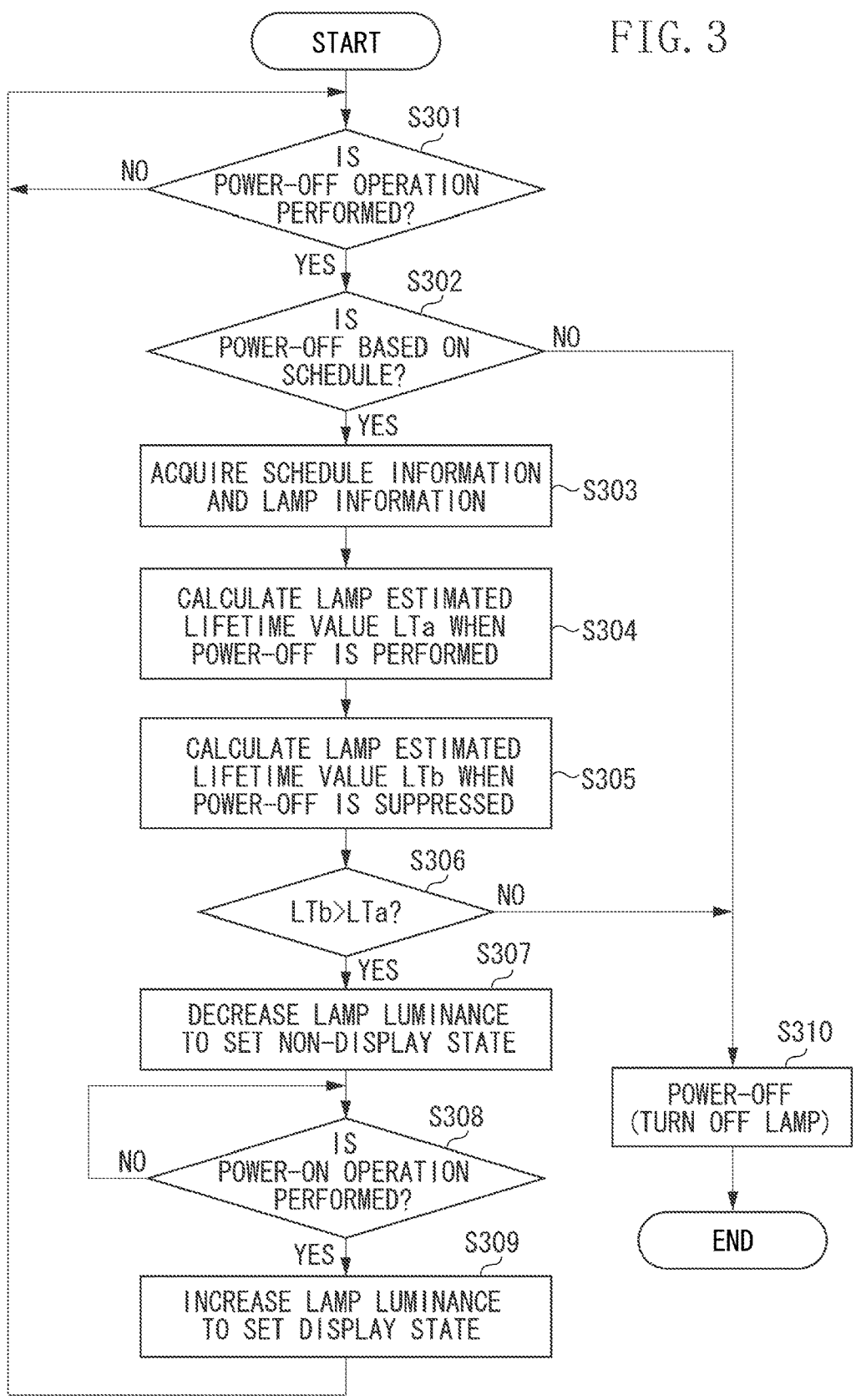
FIG. 3 is a flowchart of light source control for a power-off operation in the present exemplary embodiment.

An operation at power-off will be described with reference to FIG. 3. A control program for implementing processing illustrated in FIG. 3 is stored in the ROM 103. The CPU 101 implements the processing illustrated in FIG. 3 by reading and executing the control program from the ROM 103.

In step S301, the CPU 101 monitors presence or absence of a power-off operation. The power-off operation monitored here includes a power-off operation by the user through the operation unit 107 and a power-off operation by the schedule stored in the ROM 103. The CPU 101 repeats step S301 until the power-off operation by the user or the power-off operation by the schedule is performed. In a case where the power-off operation is detected (Yes in step S301), the processing proceeds to step S302.

In step S302, the CPU 101 determines whether the instruction of the input power-off operation is an off operation by the schedule function. In a case where the power-off operation is due to the user's operation (No in step S302), then in step S310, the CPU 101 turns off the lamp 122 of the projection unit 104 via the projection control unit 105 to end projection processing. In a case where the power-off operation is due to the scheduling function (Yes in step S302), the processing proceeds to step S303.

In step S303, the CPU 101 acquires schedule information and lamp information (light source information) registered in the nonvolatile memory of the ROM 103. The schedule information includes three pieces of time information including the time of a power-on period before the power-off operation, the time of a power-off period, and the time of the next power-on period. Regarding these times, in the example illustrated in FIG. 2, a description will be provided by taking the power-off operation on Wednesday at 12 o'clock as an example. In the example illustrated in FIG. 2, in the power-off operation on Wednesday at 12 o'clock, three pieces of time information including the time of a power-on period from 8:00 to 12:00 (4 hours), the time of a power off period from 12:00 to 13:00 (1 hour), and the time of the next power-on period (4 hours) are acquired. The lamp information includes the number of times of on/off operations of the lamp 122 after starting to be used when the lamp has been replaced (hereinafter, referred to as X times) and a total lighting time of the lamp 122 (hereinafter, referred to as a T time).

In step S304 subsequent to step S303, the CPU 101 calculates an estimated lifetime value LTa of the lamp 122 (an estimated value of how many more days the lamp 122 can be used) in a case where the power-off operation is performed based on the information obtained in step S303.

Figure 4:
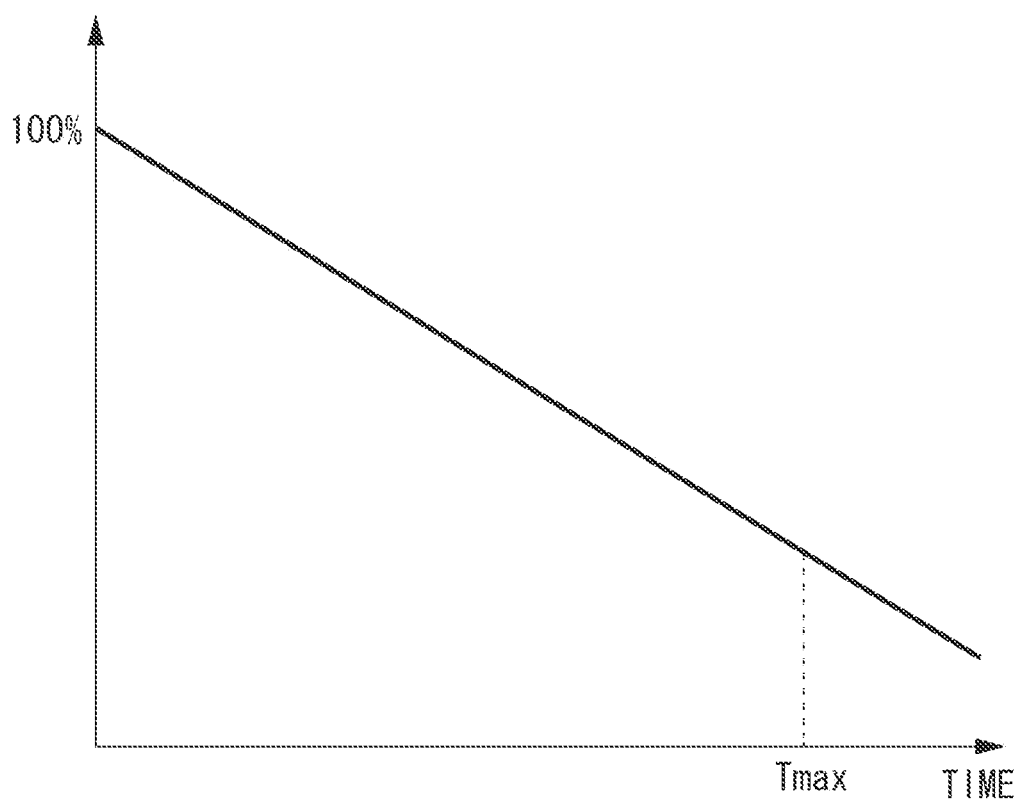
FIG. 4 is a graph illustrating a tendency of a decrease in a luminance with respect to a lighting time.

A method of calculating the estimated lifetime value of the lamp 122 will be described. A mercury lamp used as a light source of a projection apparatus is more likely to be damaged and probability of non-lighting increases with an increasing number of repetitions of on/off operations. Thus, it is desirable to minimize unnecessary on/off operations of the lamp. In the following description, the number of on/off operations at which a lifetime of the lamp ends due to on/off operations of the lamp is set as Xmax. As illustrated in FIG. 4, the mercury lamp includes a property that a luminance decreases due to lighting for a long time. In FIG. 4, a horizontal axis represents the lighting time and a vertical axis represents the luminance (relative value). Thus, it is also desirable to suppress unnecessary lighting as much as possible. In the following description, the time until the luminance decreases to or below a predetermined value to cause the lamp to become unusable is set as a decreased luminance lifetime Tmax.

In step S304, the CPU 101 calculates an estimated lifetime value LT1 related to the number of lifetime on/off operations and an estimated lifetime value LT2 related to the lighting time for the lamp 122 in use according to the following Formulas (1) and (2):

$$LT1 = (Xmax - X)/(\text{the number of on/off operations per day}) \quad (1)$$

$$LT2 = (Tmax - T)/(\text{total lighting time of the lamp per day}) \quad (2)$$

As described above, Xmax is the number of lifetime on/off operations of the lamp 122 in use and Tmax is the decreased luminance lifetime. X is the number of on/off operations of the lamp 122 after the lamp was replaced and T is the total lighting time of the lamp 122.

The CPU 101 sets a smaller value of the estimated lifetime values LT1 and LT2 obtained by Formulas (1) and (2) as the estimated lifetime value LTa of the lamp 122. For example, in the example illustrated in FIG. 2, if a projection schedule on Wednesday is taken as an example, the number of on/off operations per day is twice and the total lighting time of the lamp per day is 8 hours. Therefore, the estimated lifetime value LT1 according to Formula (1) is (Xmax−X)/2, and the estimated lifetime value LT2 according to Formula (2) is (Tmax−T)/8. The CPU 101 sets a smaller of LT1 (=(Xmax−X)/2) and LT2 (=(Tmax−T)/8) as the estimated lifetime value LTa of the lamp 122.

In step S305, the CPU 101 calculates, in a procedure similar to the procedure in step S304, an estimated lifetime value LTb of the lamp 122 when the power-off is suppressed.

In the example illustrated in FIG. 2, if power-off at 12 o'clock on Wednesday is taken as an example, when power-off between 12 to 13 o'clock is suppressed, the number of on/off operations per day is once and the total lighting time per day is 9 hours. The estimated lifetime value LT1 according to Formula (1) is (Xmax−X) and the estimated lifetime value LT2 according to Formula (2) is (Tmax−T)/9. The CPU 101 adopts a smaller value of LT1 (=(Xmax−X)) and LT2 (=(Tmax−T)/9) as the estimated lifetime value of the lamp 122.

In step S306, the CPU 101 determines whether the estimated lifetime value LTb calculated in step S305 is greater than the estimated lifetime value LTa calculated in step S304. In a case where the estimated lifetime value LTb calculated in step S305 is less than or equal to the estimated lifetime value LTa calculated in step S304 (No in step S306), in step S310, the CPU 101 turns off the lamp 122 of the projection unit 104 via the projection control unit 105 to end the projection processing illustrated in FIG. 3.

In a case where the estimated lifetime value LTb calculated in step S305 is greater than the estimated lifetime value LTa calculated in step S304 (Yes in step S306), in step S307, the CPU 101 lowers a voltage applied to the lamp 122 via the projection control unit 105 to change the liquid crystal panel 120 to the non-display state. In other words, the CPU 101 performs control via the projection control unit 105 so that the lamp 122 is not turned off accompanying a power-off operation. With the above control, projected light can be reduced to a minimum and a state close to a power-off state as much as possible can be made. In general, when the voltage applied to the lamp is lowered, a decrease in a luminance of the lamp can be suppressed. In a period in which a power-off state is simulated as described above, wear of the lamp 122 can be suppressed by suppression of the voltage applied to the lamp 122. If there is another unit for reducing an amount of light of the lamp 122, for example, an iris or a luminance modulation panel, such unit can be operated to further lower a luminance of the projected light.

When the power-off operation based on the schedule is performed, the CPU 101 compares a remaining lifetime of the lamp 122 in a case where the lamp 122 is turned off and a remaining lifetime of the lamp 122 in a case where the lamp 122 is turned on, in the power-off period. Based on the comparison result, the CPU 101 performs lighting control of the lamp 122 having the longer remaining lifetime of the lamp 122.

In step S308, the CPU 101 compares the next power-on scheduled time stored in the ROM 103 with the current time acquired from the clocking unit 109, and waits for the power-on scheduled time to come. At this point, the CPU 101 also monitors presence or absence of the power-on operation by the user using the operation unit 107.

In a case where the power-on scheduled time comes or the user performs a power-on operation (Yes in step S308), in step S309, the CPU 101 restores the luminance of the lamp 122 of the projection unit 104 via the projection control unit 105 and sets an image display state by bringing back the liquid crystal panel 120 to a display state.

In the above description, the estimated lifetime value of the lamp 122 is determined in step S306 and the power-off is suppressed in step S307, but while the operation of step S307 is performed, the luminance of the lamp 122 decreases. For users who do not desire that the luminance of the lamp 122 is lowered by the processing in step S307, another indicator can be further added before determination as to whether to execute the operation of step S307 is made. For example, the projection apparatus 100 can be provided with a setting value, such as a lifetime priority or a luminance priority of the lamp 122, and, in the case of the luminance priority, the operation of step S307 may not be performed. With this configuration, the user can select whether to prioritize a lifetime or the luminance of the lamp 122.

An exemplary embodiment in which the lamp 122 is used as a light source has been described. This not seen to be limiting, and the present disclosure can also be applied to a configuration adopting a semiconductor light source, such as a semiconductor laser or a light emitting diode, as the light source of the projection apparatus.

A configuration in which the schedule function and a mechanism to suppress the off operation of the lamp are installed in the projection apparatus 100 has been described, but a control function of the projection apparatus 100 can be located in an external control apparatus so that the operation of the projection apparatus is controlled external to the projection apparatus. For example, the schedule function, such as power-on/off of a projector, can be installed in an application operating on a personal computer (PC) so that similar processing is implemented by controlling the projection apparatus from the PC via, for example, a network. In this case, the number of on/off times of the light source of the projection apparatus and the total lighting time can be managed by an application on the PC. Alternatively, as described above, these values can be managed by the projection apparatus so that these values can be acquired from an application on the PC via, for example, a network. This configuration enables controlling the light source externally the projection apparatus to prolong the lifetime of the light source of the projection apparatus.

In the present exemplary embodiment, the estimated lifetime value based on the number of on/off times of the light source is compared with the estimated lifetime value due to a decrease in the luminance. In a case where the latter is greater, the off operation of the light source is suppressed to prolong the lifetime of the light source.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-153922, filed Aug. 9, 2017, which is hereby incorporated by reference herein in its entirety.

What is claimed is:

1. A projection apparatus comprising:
a light source configured to emit light;
a projection unit configured to project an image on a projection surface based on the light emitted by the light source;
a projection control unit configured to control the light source and the projection unit;
a control unit configured to control the projection control unit based on schedule information in which an operation of the projection apparatus and a time at which the operation is to be performed are associated in advance; and
a storage unit configured to store a number of operations of turning on or turning off the light source and a total lighting time of the light source,
wherein, in a case where the control unit performs a power-off operation of the projection apparatus based on the schedule information, the control unit performs control whether to turn off the light source based on the power-off operation based on the number of the operations and the total lighting time.

2. The projection apparatus according to claim 1, further comprising an operation unit that inputs an instruction of the power-off operation of the projection apparatus based on a user operation,
wherein, in a case where the instruction of the power-off operation of the projection apparatus is input via the operation unit, the control unit turns off the light source.

3. The projection apparatus according to claim 1,
wherein the storage unit stores first information indicating correspondences between the number of the operations and a lifetime value related to a lifetime of the light source and second information indicating correspondences between the total lighting time and the lifetime value related to the lifetime of the light source, and
wherein the control unit:
acquires a first lifetime value corresponding to the number of the operations of the light source based on the first information,
acquires a second lifetime value corresponding to the total lighting time of the light source based on the second information, and
performs, in a case where the control unit performs the power-off operation of the projection apparatus based on the schedule information, the control whether to turn off the light source based on the power-off operation based on the first lifetime value and the second lifetime value.

4. The projection apparatus according to claim 3,
wherein, in a case where the control unit performs the power-off operation of the projection apparatus based on the schedule information, the control unit:

calculates a third lifetime value and a fourth lifetime value, the third lifetime value being the shorter of the first lifetime value and the second lifetime value when the light source is turned off based on the power-off operation and the fourth lifetime value being the shorter of the first lifetime value and the second lifetime value when the light source is not turned off based on the power-off operation,
controls the light source to not turn off the light source based on the power-off operation in a case where the third lifetime value is shorter than the fourth life time value, and
controls the light source to turn off the light source based on the power-off operation in a case where the third lifetime value is greater than or equal to the fourth life time value.

5. The projection apparatus according to claim 4, wherein, in a case where the third lifetime value is shorter than the fourth lifetime value, the control unit decreases a luminance of output light of the light source in response to the power-off operation to control a light modulation element receiving the output light of the light source to a non-display state.

6. The projection apparatus according to claim 5, wherein, in a case where a luminance priority is selected in a setting of a lifetime priority or the luminance priority of the light source, the control unit suppresses the decrease in the luminance of the output light of the light source in response to the power-off operation.

7. The projection apparatus according to claim 5, wherein the control unit restores the luminance of the output light of the light source in response to a power-on operation to control the light modulation element to a display state.

8. The projection apparatus according to claim 1, wherein the light source is a lamp.

9. A control method of a projection apparatus including a light source configured to emit light, a projection unit configured to project an image on a projection surface based on the light of the light source, and a storage unit configured to store a number of operations of turning on or turning off the light source and a total lighting time of the light source, the control method comprising:
controlling the light source and the projection unit; and
controlling a projection control unit based on schedule information in which an operation of the projection apparatus and a time at which the operation is to be performed are associated in advance,
wherein, in a case where a control unit performs a power-off operation of the projection apparatus based on the schedule information, the controlling is performed whether to turn off the light source based on the power-off operation based on the number of the operations and the total lighting time.

10. The control method according to claim 9, further comprising inputting an instruction of the power-off operation of the projection apparatus based on a user operation, wherein in a case where the instruction of the power-off operation of the projection apparatus is input, the light source is turned off.

11. The control method according to claim 9, wherein first information is stored indicating correspondences between the number of operations and a lifetime value related to a lifetime of the light source and second information is stored indicating correspondences between the total lighting time and the lifetime value related to the lifetime of the light source, and wherein the control method further comprises:

acquiring a first lifetime value corresponding to the number of the operations of the light source based on the first information, acquiring a second lifetime value corresponding to the total lighting time of the light source based on the second information, and controlling, in a case where the power-off operation of the projection apparatus is performed based on the schedule information, to turn off the light source based on the power-off operation based on the first lifetime value and the second lifetime value.

12. The control method according to claim 10, wherein in case where the power-off operation of the projection apparatus is performed based on the schedule information, the control method further comprises:

calculating a third lifetime value and a fourth lifetime value, the third lifetime value being the shorter of the first lifetime value and the second lifetime value when the light source is turned off based on the power-off operation and the fourth lifetime value being the shorter of the first lifetime value and the second lifetime value when the light source is not turned off based on the power-off operation, controlling the light source to not turn off the light source based on the power-off operation in a case where the third lifetime value is shorter than the fourth life time value, and controlling the light source to turn off the light source based on the power-off operation in a case where the third lifetime value is greater than or equal to the fourth life time value.

13. The control method according to claim 11, wherein, in a case where the third lifetime value is shorter than the fourth lifetime value, the control method further comprises decreasing a luminance of output light of the light source in response to the power-off operation to control a light modulation element receiving the output light of the light source to a non-display state.

14. The control method according to claim 12, wherein, in a case where a luminance priority is selected in a setting of a lifetime priority or the luminance priority of the light source, the control method further comprises suppressing the decrease in the luminance of the output light of the light source in response to the power-off operation.

15. The control method according to claim 12, wherein the control method further comprises restoring the luminance of the output light of the light source in response to a power-on operation to control the light modulation element to a display state.

16. A computer-readable storage medium storing a program that causes a projection apparatus including a light source configured to emit light, a projection unit configured to project an image on a projection surface based on the light of the light source, and a storage unit configured to store a number of operations of turning on or turning off the light source and a total lighting time of the light source to execute a method, the method comprising:

controlling the light source and the projection unit; and controlling a projection control unit based on schedule information in which an operation of the projection apparatus and a time at which the operation is to be performed are associated in advance, wherein, in a case where a power-off operation of the projection apparatus is performed based on the schedule information, the controlling is performed whether to turn off the light source based on the power-off operation based on the number of the operations and the total lighting time.

* * * * *